United States Patent [19]

Claassen et al.

[11] 4,430,111
[45] Feb. 7, 1984

[54] METHOD AND APPARATUS TO REMOVE SHARPLY BENT, TEMPERED GLASS SHEETS FROM A COOLING STATION

[75] Inventors: George R. Claassen, New Kensington; John J. Ewing, Tarentum, both of Pa.

[73] Assignee: PPG Industries, Inc., Pittsburgh, Pa.

[21] Appl. No.: 402,672

[22] Filed: Jul. 28, 1982

[51] Int. Cl.³ .......................................... C03B 23/035
[52] U.S. Cl. ...................................... 65/114; 65/104; 65/273; 65/351
[58] Field of Search ................. 65/104, 106, 107, 288, 65/273, 287, 114, 351, 348

[56] References Cited

U.S. PATENT DOCUMENTS 4,204,854  5/1980  McMaster et al. ............... 65/104 X
4,361,432  11/1982 McMaster et al. ............... 65/114 X
4,364,765  12/1982 McMaster et al. ................... 65/106
4,368,065  1/1983  Frank ............................... 65/273 X Primary Examiner—Arthur D. Kellogg
Attorney, Agent, or Firm—Edward I. Mates

[57] ABSTRACT

In the bending and tempering of sharply bent glass sheets supported on a ring-like member for conveyance of the bent glass sheet through a cooling station, a transfer device for unloading the sharply bent, tempered glass sheet is provided. The transfer device is so constructed and arranged that it does not cause a bottleneck in high speed, mass production of sharply bent, tempered glass sheets, avoids uncontrolled departures from the desired shape of the bent, tempered glass sheets, particularly those that develop in the marginal edge portion of the glass sheets that must fit exactly into glass sheet receiving frames of installation structures or vehicles, provides clearance for the sharply bent glass sheets and enables the glass sheet to transfer so gently as to inhibit the likelihood of breakage resulting from uncontrolled dropping of bent, tempered glass sheets during their handling.

7 Claims, 5 Drawing Figures

METHOD AND APPARATUS TO REMOVE SHARPLY BENT, TEMPERED GLASS SHEETS FROM A COOLING STATION

BACKGROUND OF THE INVENTION

The present invention relates to a method and apparatus for bending glass sheets and particularly those that are bent by a method involving conveying glass sheets into a bending station where each glass sheet is delivered at its deformation temperature for bending. After bending, a ring-like member supports the glass sheet for movement from the bending station through a cooling station. Tempering medium, most usually in the form of pressurized blasts of air, is imparted against the opposite surfaces of the glass sheet at the cooling station at a rate sufficient to cool the heated, bent glass sheet and impart at least a partial temper thereto. The bent, tempered glass sheet is then transferred onto a removal conveyor.

In the past, prior art transfer systems limited the speed at which a bending and tempering operation could be performed, because the transfer step was a bottleneck that restricted the rate at which glass sheets could be processed because of the need to unload a bent, tempered glass sheet from the ring-like member before the ring-like member could return to the shaping station to receive a succeeding glass sheet or glass sheet set at the shaping station. Other prior art transfer systems that reduced the duration of the bottleneck tended to cause the bent, tempered glass sheets to become distorted or develop surface mars or breakage due to the nature of the transfer operation in various types of prior art higher speed transfer systems.

Since the automotive industry has been required in recent years to develop automobiles that reduce their fuel consumption, it has become necessary to bend and temper thinner glass sheets than those found suitable in the past. The present invention relates to the treatment of relatively thin glass sheets, particularly those having a nominal thickness of ⅛ inch (3.2 millimeters) or less. Thinner glass sheets sag more readily than thicker glass sheets at any given elevated temperature above the glass deformation temperature. Hence, it is more difficult to control the shape imparted to thinner glass sheets, and in recent years the shaping of thinner glass sheets has incorporated the use of vacuum molds having lower apertured walls enclosing a chamber through which suction is applied to hold a heat-softened glass sheet by vacuum against the downwardly shaping surface of a shaping mold to control its sag during the shaping operation.

Bent glass sheets are widely used as side windows or rear windows in vehicles such as automobiles or the like in positions where tempered glass sheets are permitted. To be suitable for such application, flat glass sheets must be shaped to precisely defined curvatures dictated by the shape and outline of the frame defining the window openings into which the glass side windows and rear windows are installed. It is also important that the side windows meet stringent optical requirements and that the windows be free of optical defects that would interfere with the clear viewing therethrough, particularly in their viewing area.

During their fabrication, glass sheets intended for use as shaped windows in vehicles are subjected to thermal treatment to temper as well as to bend the glass sheets. Tempering increases the resistance of the shaped windows to damage resulting from impact. In addition to increasing the resistance of the glass sheet to breakage, tempering also causes the glass sheet to fracture into relatively small, relatively smoothly surfaced fragments that are relatively safe compared to the relatively large, jagged fragments that result from the more frequent breakage of untempered glass.

The commerical production of bent glass sheets for such purposes commonly includes heating flat glass sheets to the softening point of the glass, bending the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of the path into a bending station where each glass sheet in turn is transferred onto a lifting mold that lifts the glass sheet into adjacency to a vacuum mold. Suction is applied to the vacuum mold to lift and hold the shaped glass sheet in pressurized engagement thereagainst. The lifting mold retracts to below the substantially horizontal path. At about the same time, a ring-like member having an outline shape conforming to that of the glass sheet slightly inboard of its perimeter moves upstream into a position below the upper vacuum mold and above the lower lifting mold. Release of the vacuum deposits the bent glass sheet onto the ring-like member. The ring-like member conveys the glass sheet into a cooling station for rapid cooling. A transfer device removes the bent, tempered glass sheet from the ring-like member and transfers the removed sheet onto a downstream conveyor.

It would be beneficial for the glass sheet bending art to develop a type of transfer device that operates rapidly enough to minimize any bottleneck in the fabrication of sharply bent, tempered glass sheets. It would also be beneficial to have a transfer device that does not distort a bent, tempered glass sheet in order to impart a more precise shape to the thinner glass sheets presently treated for the production of tempered side windows and rear windows of automobiles and other vehicles. It would also be beneficial to have a transfer device that does not scratch the glass surface or scrape it against nozzles in the cooling station when it transfers a bent, tempered glass sheet from a ring-like member to a downstream conveyor. Finally, it would be beneficial to have a transfer device that does not cause a transferred glass sheet to crash abruptly during its transfer so as to reduce and possibly even eliminate breakage of bent, tempered glass sheets during their transfer.

Glass sheets have also been bent and tempered by mounting a flat glass sheet in bending relation to an outline mold of ring-like configuration, supporting the glass sheet on the mold while conveying the mold through a tunnel-type furnace where the glass sheet is heated to above its deformation point so that it sags by gravity to conform to the shape of the mold in both elevation and outline. If desired, the shape of the glass sheet conforms to a complicated shape by temporarily removing the sheet from the outline mold to impart a complicated shape by press bending, for example, before replacing the bent glass sheet onto the outline mold. The mold with its supported bent glass sheet immediately transfers to a cooling station where the glass sheet cools at a sufficiently rapid rate to impart at least a partial temper in the glass. In the past, the bent, tempered glass sheet was supported on the outline mold for further cooling to handling temperature.

This system required a large number of outline molds for a mass production bending and tempering operation. A suitable glass sheet transfer device at a location where the bent glass sheet is tempered and its surface fully hardened would transfer the glass from the mold to an unloading conveyor at a temperature above the handling temperature and would reduce the number of outline molds needed for a mass production operation.

DESCRIPTION OF PATENTS OF INTEREST

U.S. Pat. No. 2,957,277 to Gerald White and Frank J. Carson reduces the number of molds needed for a complete complement to bend and anneal pairs of glass sheets for later lamination into windshields. After each outline mold in turn moves through a tunnel-type lehr where each supported pair of glass sheets sags by gravity to conform in elevation and outline to the outline shape of the mold, and then is cooled at a controlled cooling rate in an annealing zone beyond the lehr, the glass sheets are lifted off the mold at a temperature blow the strain point of the glass and engaged by the tines of a fork-like member. The latter transfer the bent, annealed pair of glass sheets onto a roller conveyor for movement thereon through a cooling zone where the glass is cooled to handling temperature. The mechanical lifters that lift the glass sheet pair may distort the glass in the region of lifting unless the lifting takes place after the glass sheet cools to near its handling temperature. The lower the glass temperature is when the bent glass sheet pair is removed, the less is the reduction in mold complement needed for a mass production operation.

Glass sheets supported on outline molds for shaping and annealing or tempering tend to develop uncontrolled sag in their unsupported center portions. Various patented inventions have been developed to control this sag tendency.

U.S. Pat. No. 3,607,200 to Harold A. McMaster discloses glass sheet shaping apparatus comprising a ring mold that lifts a glass sheet while the latter is at or above its deformation temperature into engagement with a downwardly facing convex bending mold and then transfers the bent glass sheet to a shuttle at a cooling station. If desired, the downwardly facing, convex shaping mold may be perforated to form the bottom wall of a vacuum chamber that sucks the heat-softened glass sheet into a more intimate contact with the configuration of the downwardly facing, convex shaping mold. Mechanical means are used to transfer the shaped glass sheet to the shuttle.

U.S. Pat. No.3,846,104 to Samuel L. Seymour makes possible a faster bending and tempering cycle than its prior art by providing method and apparatus in which a bending mold moves only vertically at the bending station, a vacuum mold remains at the bending station and means to support a glass sheet adjacent its marginal or peripheral edge only, preferably comprising a ring-like member, moves generally horizontally between the bending station and a cooling station so that it is possible to cool one glass sheet while another is being bent, thus making it possible to reduce the duration of a bending and cooling cycle. The tempering ring is shaped to conform to the outline of the bent glass sheet so that the latter is supported more securely during cooling than by the spaced fingers of the prior art, even though the ring-like member is reciprocated while supporting the bent glass sheet in the cooling station. The Seymour invention is characterized by first supporting a heated glass sheet on a lower bending mold, then sandwiching the glass sheet between said lower bending mold and an upper vacuum mold, then holding the bent glass sheet against the upper mold while retracting the lower mold, then transferring the bent glass sheet to a tempering ring having an outline support surface that conforms to the shape of the bent glass sheet but is slightly smaller in extent and provides sufficient support points around the bent glass sheet periphery to positively support the bent glass sheet during its transfer to and residence at the cooling station. The Seymour patent apparatus uses vacuum cups to help transfer the bent, tempered glass sheet from the tempering ring to an unloading conveyor.

U.S. Pat. No. 4,092,141 to Robert G. Frank and DeWitt W. Lampman provides a method and apparatus for bending and tempering glass sheets that utilizes a transfer device that is more easily maintained in operating condition than the vacuum cups of the Seymour unloading device. After the sheet is bent and cooled, the Frank and Lampman patented apparatus provides a vertically movable sheet transfer means that rapidly lifts each bent glass sheet to remove the latter from the continuous ring member after the glass sheet has had its surfaces hardened sufficiently to permit it to be conveyed on an additional downstream conveyor providing spaced rotating rolls along a glass sheet supporting surface at an elevation slightly higher than the level at which the glass sheet is supported by the continuous ring member. However, since the continuous ring member is endless, the apparatus of this patent delays the return movement of the continuous ring member to the first or bending station until after the trailing edge of the bent, surface hardened glass sheet has moved downstream into a position in which the entire glass sheet is completely beyond the continuous ring member, and the transfer means is lowered to a position providing clearance for returning the shuttling continuous ring member to the first station.

The sheet transfer means for removing the glass from the continuous ring member to the additional downstream conveyor according to the Frank and Lampman patent comprises a frame support and lifting and lowering mechanism for raising and lowering the frame support and a plurality of rotating conveyor rolls having doughnut shaped support members carried by narrow shafts mounted on the frame support. The apparatus is so constructed that the conveyor rolls of the sheet transfer means are arranged in a matrix on parallel shafts that move vertically in unison between a lower, recessed position where the rotating conveyor rolls are clearly below the movement of the continuous ring member and its supporting carriage and a raised position wherein the rotating conveyor rolls have a common upper tangential surface and provide rotating elements of a glass sheet supporting surface disposed above the level of support provided by the upper edge surface of the continuous ring member and at a level of support provided by a tangential surface common to the rolls of the additional downstream conveyor.

U.S. Pat. No. 4,185,986 to Robert G. Frank provides a feature that enables a ring-like member, which is substituted for the continuous ring member of the two previously described patents, to start its return to the shaping station sooner than permitted by the prior art and, more specifically, before the vertically movable rotating conveyor rolls of the glass sheet transfer means have moved the tempered glass sheet beyond the extreme downstream position that the ring-like member occupies during the production cycle and before the rotating rolls of the sheet transfer means are lowered to their recessed position. The ring-like member of the latter patent comprises a pair of downstream end portions which extend transversely toward one another and are laterally spaced from one another to provide a single, transversely extending space therebetween. The transversely extending space provided in this patent is slightly wider than the space between the outer surfaces of the transfer rolls mounted on common shafts to permit the vertically moveable transfer means to be entirely clear to move between the lateral inner ends of the spaced, transversely extending downstream end portions of the ring-like member even when the transfer means is in its raised position. Unfortunately, in dealing with glass sheets of ⅛ inch thickness (3.2 mm.) and less, the time needed to transfer a hot glass sheet from the bending station to the transfer station was such that the unsupported leading edge portion of the glass sheet in the downstream end portion of the glass developed sag beyond tolerance limits.

U.S. Pat. No. 4,331,464 of George R. Claassen and John J. Ewing, discloses a rail member to occupy a major portion of the space between the inner ends of the laterally extending downstream end portions of the rail-like member. The ends of the rail member are spaced from the ends of the downstream end portions of the ring-like member a smaller distance than the original space to provide a plurality of narrow clearances for the thickness of each of the transfer rolls mounted on the common shafts. The upper edge surface of the rail member occupies the same position it would occupy if it were a portion of a continuous ring member instead of an insert within the transverse space of a discontinuous downstream portion of a ring-like member. Therefore, it provides auxiliary support for a major portion of the leading edge portion of the glass sheet that was formerly unsupported. In a specific embodiment of this invention, a cantilever support means is provided to support the novel rail member of this invention. The cantilever support means has no structural elements above or below the ring-like member and no structural elements aligned longitudinally of the smaller spaces between the ends of the added rail member and the inturned ends of the ring-like member.

While the shape of bent, tempered glass sheets fabricated using the modified ring-like member of the Claassen and Ewing invention conforms more closely to the pattern required by the customer than those produced using the modified ring-like member of the Frank and Lampman patent, nevertheless, some uncontrolled sag associated with the gaps in the leading edge portion of the ring-like member is present. This uncontrolled sag has been associated with the lack of support of the portions of the glass sheet that overlie the gaps in the ring-like member when the glass sheet is dropped while still at its deformation temperature on the ring-like member at the bending station where a certain amount of bending is accomplished by drop-forming, and the unsupported leading edge portions of the glass sheet sag to an extent limited by the length of the gaps during the time starting with the instant that the heat-softened glass sheet drops onto the ring-like member and ending with the instant that the glass sheet temperature cools to a temperature at which the entire glass sheet marginal portion including those lengths aligned over the gaps in the ring-like member are sufficiently rigid to end further sagging.

Supporting the heat-softened glass sheet on a continuous ring instead of a discontinuous ring-like member, even those with smaller gaps, would eliminate undesired sag in the marginal edge portion that must be fitted exactly to a curved mounting frame. U.S. Pat. No. 4,282,026 to Harold A. McMaster, Norman C. Nitschke and John S. Nitschke discloses a glass sheet shaping and tempering apparatus that transfers a tempered glass sheet from a continuous transfer ring onto a delivery ring, which is also continuous, by providing a series of bumpers extending downward from an upper plenum chamber a greater vertical distance than downwardly directed nozzles to engage the upper surface of a glass sheet delivered by said continuous transfer ring from a bending station to a position between upper and lower plenum chambers at a cooling station. When air supply to the upper plenum chamber is throttled, air delivered in an upward direction from the lower plenum chamber forces the glass sheet upward against the bumpers. The glass sheet remains in this upward position while the continuous transfer ring returns from the transfer station to the bending station along a longitudinal path to provide clearance for the delivery ring to move along a transverse path into the transfer station from a delivery ring unloading station to one side of the transfer station. After the transfer ring leaves the transfer station and the delivery ring arrives at the transfer station, air is caused to flow again into the upper plenum chamber for release through downwardly extending nozzles in a downward direction against the upper surface of the bent, tempered glass sheet. Resuming the pressurized air flow through the upper plenum chambers causes the bent, tempered glass sheet to fall onto and impact strongly against the delivery ring. An impacted glass sheet is likely to break as a result of the sharp impact of its fall, particularly when the glass sheet has a flaw or other source of localized high tension stress in the tempered glass sheet.

U.S. Patent Application Ser. No. 322,787 of Robert G. Frank, filed Nov. 17, 1981 which has matured into U.S. Pat. No. 4,368,065, replaces the bumpers of U.S. Pat. No. 4,282,026 with substantially horizontally extending elongated arms that shuttle the lifted glass sheet from a position at the downstream end of the cooling station between the upper and lower plenum chambers into an inclined position over the upper run of a downstream conveyor belt system where the glass sheet is gently and gradually disengaged from the elongated arms and gently deposited onto the upper run of a downstream conveyor belt system. The gentle nature of the transfer of the shaped, temepred glass sheet from engagement against the elongated arms to support by the upper run reduces the likelihood that the glass sheet will break during its transfer. However, unless each nozzle extending from the upper plenum chamber is adjustable in position to accommodate sharp bends, the upper nozzles would interfere with the transfer of sharply bent sheets.

SUMMARY OF THE PRESENT INVENTION

The present invention uses a transfer device that incorporates a cycling of net upward flow of tempering medium coordinated with intermittent upward movement of an upper plenum chamber at the downstream end of a cooling station to lift the bent, tempered glass sheet into engagement with the elongated arms of the aforesaid Frank invention. As the elongated arms await engagement by the rising sharply bent glass sheet, the upper plenum chamber moves upward to clear the nozzles of the downstream upper plenum chamber from engagement by the lifting glass sheet. Then, the elongated arms convey the lifted glass sheet in a downstream direction toward the downstream conveyor simultaneously with the upstream movement of the ring-like member to the bending station. In addition, the present invention can be accomplished using a continuous ring for the ring-like member without causing a bottleneck that slows down the operation. Of course, the continuous ring is free of gaps that cause uncontrolled sag along portions of the marginal portion of the bent, tempered glass sheet.

For the reasons just explained, the present invention provides method and apparatus for transferring bent, tempered glass sheets, even those that are sharply bent, from a cooling station to glass sheet removal means in the form of a downstream conveyor that permits a rapid rate of production for mass production purposes of bent, tempered glass sheets having smoothly shaped marginal edge portions that conform to the shape of a mounting frame without any undesirable marginal edge sag and with a reduced frequency of breakage during the mass production operation.

The benefits of the present invention will be understood better in light of a description of a specific embodiment of this invention which follows.

DESCRIPTION OF THE DRAWINGS

In the drawings that form part of a description of a preferred embodiment of this invention.

DESCRIPTION OF THE PREFERRED EMBODIMENT

Figure 1:
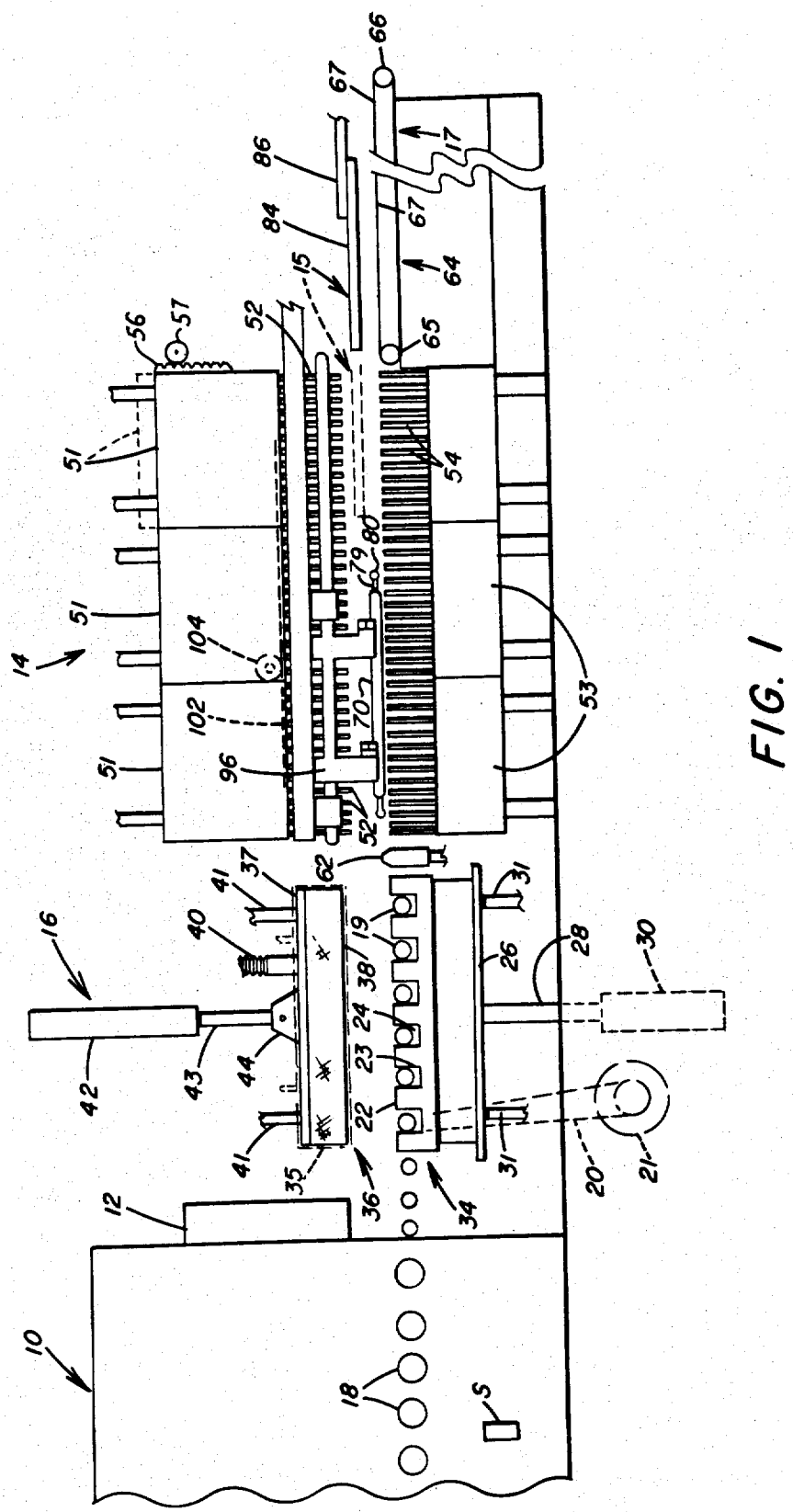
FIG. 1 is a fragmentary longitudinal view of a portion of a glass sheet shaping apparatus which includes an exit end portion of a heating furnace and a cooling station, a transfer device and a downstream conveyor with certain parts removed in part to show other parts in greater detail.
Figure 2:
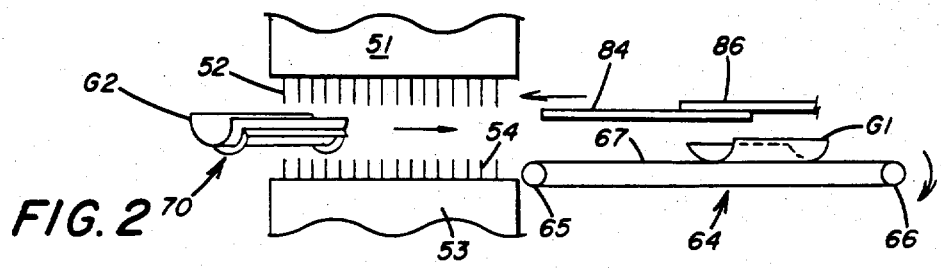
FIG. 2 is a schematic view of the transfer device and its associated structural elements at an early stage of a repetitive operational cycle.

Referring to FIGS. 1 and 2 of the drawings, an apparatus for heating and shaping sheets of material, such as glass, includes a heating means including a tunnel-type furnace 10 having a vertically movable exit door 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. A transfer device 15 is located near the downstream end of the cooling station 14. An intermediate or bending station 16 is disposed between the furnace 12 and the cooling station 14. The transfer device transfers the shaped and tempered glass sheet to a downstream conveyor 17 for transport to the unloading station.

Heat may be supplied in the furnace 12 by hot gases from gas burners or by electrical radiant heaters or by a combination of both, which heat supply means are well known in the art. The apparatus includes a horizontal conveyor comprising longitudinally spaced, transversely extending conveyor rolls 18 that define a path of travel which extends through the furnace 12 and additional smaller diameter conveyor rolls 19 that define an extension of said path into the bending station 16. The rolls of the conveyor are arranged in sections and their rotational speeds may be controlled through clutches or other time control devices well known in the art (not shown), and one or more drive chains 20, each coupled to a drive motor 21 so that the speed of the different conveyor sections may be controlled and synchronized in a manner well known in the art. A glass sensing element S is located before the exit door 12 to initiate a cycle of operation of this apparatus.

A timer circuit is provided to synchronize the operation of various elements of the apparatus according to a predetermined sequence. The glass sensing element S and the timer circuit actuated thereby cooperate to provide synchronizing means for the apparatus of the present specification in a manner well known in this art.

The bending station 16 comprises a lower mold 34 and an upper vacuum mold 36. The latter may be covered by a flexible fabric cover 35 of a refractory material, such as fiber glass, that does not harm heat-softened glass on pressurized engagement therewith. The former comprises an upper surface 22 conforming in elevational shape to a first shape desired for a glass sheet to be bent. The upper surface 22 is located at the upper ends of transversely extending lands 23 extending completely across the transverse dimension of the lower mold 36. The lands are spaced by transversely extending grooves 24 which extend across the entire transverse dimension of the lower mold 34. The grooves have sufficient depth to provide clearance for raising and lowering the lower mold 34 between a recessed position below the conveyor rolls 19, and an upper position above the level of said latter conveyor rolls. The lower mold 34 is fixed to a lower mold support 26 and is limited to its upward movement toward the upper vacuum mold 36 to a closest spacing therebetween slightly greater than the glass sheet thickness, preferably no less than approximately twice the glass sheet thickness.

Since automobile side windows have a fairly constant radius of curvature about a horizontal axis in order to facilitate their raising and lowering in an automobile body between an open and a closed position, many different patterns in a family of patterns have different outline shapes but are bent to the same radius of curvature. Therefore, it is desirable to have one lower mold capable of producing each family of patterns. It has been found that a lower shaping mold of a given radius of curvature having longer dimensions than a family of side windows of said given radius of curvature but of different outline shapes and/or different dimensions can fabricate curved side windows of said family of different sizes but of said given radius of curvature. In the apparatus of this specification, one lower shaping mold can be installed in conjunction with an upper vacuum mold of slightly different curvature to produce any pattern of a family of patterns having a given radius of curvature but of different sizes and/or outline shapes without requiring any removal or replacement of the lower mold and/or of the upper vacuum mold.

The upper surface 22 of the lower mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE ®. If desired, the upper surface 22 of the lands 23 of the lower mold may be covered with a flexible fabric cover (not shown) of a refractory material, such as fiber glass, that does not harm heat-softened glass on pressurized engagement therewith. Such covering is preferably in the form of strips, one strip being applied to each land.

Raising and lowering means in the form of a lower piston rod 28 movably mounted to a rigidly supported piston cylinder 30 raises and lowers support 26 and its attached lower shaping mold 34 a limited distance. Alignment posts 31 are attached to mold support 26 to assure exact vertical movement of the lower mold 34. The alignment posts 31 move vertically through alignment sleeves (not shown) mounted to a supporting framework (not shown) for the shaping apparatus in a manner well known in the art.

The upper vacuum mold 36 has an upper wall member 37 connected to a lower wall 38 that is apertured. The lower wall 38 may have its downwardly facing surface shaped to be less sharply bent than the shaping surface formed by the upper surface 22 of the lower mold 34.

The upper vacuum mold 36 communicates with a source of vacuum (not shown) through a flexible evacuation pipe 40 and a suitable valve (not shown). The upper vacuum mold 36 is suitably connected through upper vertical guide rods 41 which move vertically through alignment sleeves (not shown) mounted to an upper supporting frame (not shown) which supports an upper vertical piston 42 and is movable relative to the upper supporting frame by an upper vertical piston rod 43 mounted in piston 42 and a clevis connection 44 to the upper wall member 37.

The evacuation pipe 40 may be selectively connected through a suitable valve arrangement to a source of pressurized air (not shown) and the valves for the vacuum line and for the pressure line may be synchronized according to a predetermined time cycle in a manner well known in the art. As an alternative, the upper wall member 37 may be apertured to receive a pressure feed pipe connected via suitable valving to a pressurized air source independently of evacuation pipe 40.

The apertures in the apertured lower wall 38 are made as small as possible and are spaced as closely as is necessary to assure vacuum support for a hot glass sheet with reasonable energy consumption. For an upper vacuum mold having a glass sheet engaging apertured lower wall 38 with dimensions 46 inches (117 centimeters) long and 22 inches (56 centimeters) wide, apertures having a diameter of 0.09 inches (0.23 centimeters) and spaced apart from one another 1.5 inches (3.8 centimeters) in a rectangular or diamond pattern have been found to work adequately in handling glass sheets whose weight is up to 20 pounds (9 kilograms). The apertures extend through the entire thickness of the downwardly facing apertured wall 38.

The cooling station 14 comprises several upper plenum chambers 51, each provided with longitudinally spaced transverse rows of transversely spaced pipe nozzles 52 extending downward to direct air applied under pressure to the upper plenum chambers toward the upper surface of a glass sheet that is aligned with the bottom openings of the nozzles. Opposing each upper plenum chamber 51 is a lower plenum chamber 53 provided with a lower bar-type nozzle housing 54 disposed with thick walls extending vertically and having elongated openings directed upward through their thickness so that air blasts applied under pressure to the lower plenum chambers 53 are directed through the elongated openings upward against the lower major surface of the glass sheet. The array of openings of the lower bar-type nozzle housings opposes a corresponding array of openings in the upper pipe nozzles.

The downstream upper plenum chamber 51 is provided with means for vertical movement. While any well known elevator means may be provided, FIG. 1 shows a rack 56 extending vertically along the downstream wall of the downstream upper plenum chamber 51 engaged by a fixed pinion 57. The rack 56 and pinion 57 are capable of moving the downstream upper plenum chamber 51 into an elevated position depicted in phantom in FIG. 1 and into its normal position depicted in solid lines.

The bar-type nozzle housings are spaced vertically below the upper pipe nozzles to provide clearance for moving a ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween.

The plenum chambers 51 and 53 are shown separated into discrete upper and lower chambers along the length of cooling station 14 to provide different air pressures into the various upper plenum chambers and the lower plenum chambers so as to provide a program of air blasts along the length of the cooling station 14. The illustrated apparatus has three upper and three lower plenum chambers, each subdivided into two sections. The exact numbers may vary, if desired, without departing from the gist of this invention.

The lower bar-type nozzles 54 may be interconnected to a common pivotally mounted frame (not shown). A construction similar to that disclosed and claimed in U.S. Pat. No. 3,846,106 to Samuel L. Seymour for pivoting a lower set of nozzles may be used for pivoting apparatus to rapidly remove cullet by sliding relative to the lower bar-type nozzles 54 of the illustrative embodiment of this invention.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The ring-like member 70 comprises a rail that extends in the form of a ring-like structure disposed edgewise with its width forming the height of the rail. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. A preferred construction for the ring-like member is disclosed in U.S. Pat. No. 3,973,943 to Seymour, the disclosure of which is incorporated herein by reference.

The reinforcing frame 80 is connected to a carriage 96. The carriage 96 is connected to a rack 102 on each side of the carriage 96. The racks 102 are connected to reversible pinions 104, which are actuated by a reversible drive motor (not shown). This arrangement guides the movement of the ring-like member 70 between an upstream position at bending station 16, a downstream position in alignment with a sheet transfer means (not shown) at the downstream end of the cooling station 14 and an intermediate packing position just downstream of the bending station. The carriage 96 is reinforced by several arcuate cross braces (not shown) shaped to conform with the transverse curved shape defined by the upper surfaces of the lower bar-type nozzle housings 54 and the lower ends of the rows of upper pipe nozzles 52 so as to be capable of moving therebetween.

The carriage 96, the ring-like member 70 and its reinforcing frame constitute shuttle means for transferring one or more bent glass sheets from the bending station 16 to the cooling station 14 where the glass is cooled and transferred to an unloading device (not shown). The shuttle means is capable of returning to the bending station 16 at a suitable moment in the next cycle.

An elongated housing 62 extends across the width of the apparatus between the bending station 16 and the cooling station 14. The roof of the housing 62 tapers upwardly and inwardly to provide a narrow slot extending across the apparatus in a horizontal plane clear of the path taken by the shuttle means 70, 80, 96 when the latter moves between the shaping station 16 and the cooling station 14. Air is supplied continuously to the housing 62 at a relatively low pressure for escape upward through the narrow slot to provide a continuous air curtain that protects the mold parts somewhat from impingement by air blasts from the tempering nozzles that would tend to cause an enhanced temperature gradient along the mold parts in the direction of the path of glass sheet movement in the absence of the continuous air curtain. The air curtain is believed to be superior to a mechanical barrier that must be lifted to protect the mold parts between successive transfer operations and lowered intermittently each time the shuttle means moves through the boundary region downstream of the bending station 16 and upstream of the cooling station 14.

The downstream conveyor 17 comprises one or more transfer belts 64, each running between an upstream pulley 65 immediately beyond the cooling station 14 and a downstream pulley 66 to define an upper run 67 supported at a level slightly below the level of the path that the ring-like member 70 takes while traversing the cooling station 14. The transfer device 15 comprises elongated arms 84 supported in transversely spaced arrangement to extend longitudinally upstream from a cantilever support 86. The transfer device 15 is constructed and arranged so that the elongated arms 84 are movable between a downstream position depicted in solid lines in FIG. 1 and an upstream position (depicted in phantom in FIG. 1) at the downstream end of the cooling station 14 at a level below the lower ends of the upper nozzles 52 and above the path traversed by the ring-like member 70. The elongated arms 84 extend longitudinally between a pair of side members of the carriage 96 to enable the elongated arms 84 and the carriage 96 to have clearance to move in opposite directions overlapping one another in said upstream position.

Two elongated arms 84 are usually provided to extend horizontally in a common horizontal plane in alignment with one another. However, the present invention also envisions a plurality of elongated arms arranged along an arcuate surface conforming to the transverse shape of the bent glass sheet. At least one elongated arm is required on each side of the longitudinal axis passing through the center of gravity of the bent glass sheet.

A Cycle of Operation

At the beginning of a shaping cycle initiated by glass sensing element S sensing the presence of a glass sheet thereover according to the present invention, the glass sheet is conveyed into the glass sheet bending station 16 on conveyor rolls 18 and 19 with the lower mold 34 disposed in a retracted position with its upward facing shaping surface 22 entirely below the upper support surface provided by the conveyor rolls 19 and the upper vacuum mold 36 having the downward facing shaping surface of its apertured wall 38 spaced a short distance above the upper surface of the glass sheet. The latter travels until it reaches a position of alignment between the lower mold 34 and the upper vacuum mold 36. When the glass sheet is initially shaped to a cylindrical curve about an axis extending substantially parallel to the direction of glass sheet movement defined by the conveyor rolls 18 and 19, the exact moment that the lower mold 34 is actuated is not as critical as it would be for more complicated bends.

As the glass sheet arrives at the bending station 16, a timer initiated by sensing element S actuates piston 28 and causes vacuum to be applied to the upper vacuum mold 36 as the lower mold 34 is lifted. The glass sheet is lifted on the lower mold 34 into a position in the vicinity of the upper vacuum mold 36. The latter is initially supported in closely spaced relation (several glass sheet thicknesses) above the upper tangent common to conveyor rolls 19. Since the glass sheet is hot when it arrives at the shaping station, it readily sags by gravity to conform to the relatively sharp curvature of the upwardly facing shaping surface 22 defined by the shaped lands 23 of the lower mold 34 when the latter lifts the soft glass sheet into a position in close adjancency to the downward facing shaping surface of the lower apertured wall 38 of the upper vacuum mold 36. The glass sheet is lifted into close adjacency to the upper vacuum mold 36 by limiting the extent of upward movement of piston 28, and before the glass sheet is simultaneously engaged between the upward facing surface 22 of the lower mold 34 and the downward facing shaping surface of the upper vacuum mold 36, suction lifts the shaped glass sheet so that the peripheral portion only of the glass is initially brought into engagement with the downward facing shaping surface of the upper vacuum mold 36. The shape defined by the downward facing shaping surface of the upper vacuum mold 36 is of a shallower bend than the upward facing shaping surface of the lower mold 36 with the portion of the glass sheet intermediate its end portions initially out of contact with the downward facing shaping surface of the upper vacuum mold 36.

Lower mold 34 has been lifted in response to the sensing element S actuating a timer circuit (not shown) that extends the piston 28 in timed sequence after sensing the passage of the glass sheet over the sensing element S. The timer also controls the onset of the return of the lower shaping mold to its recessed position. The latter timer is timed to insure that the return of the lower mold 34 by retraction of piston 28 is coordinated with the time that the glass sheet is engaged by suction against the downward facing shaping surface of the upper vacuum mold 36. The timer also initiates the upward retraction of vertical piston 43 which causes lifting of the upper vacuum mold 36 simultaneously with the further downward movement of the lower mold 34. Vacuum is continued as the upper vacuum mold rises so as to cause the upper surface of the glass sheet to conform exactly to the more shallow shape of the downwardly facing shaping surface of the upper vacuum mold 36.

When the upper vacuum mold 36 reaches its upper position, the shaping station is now ready to receive the ring-like member 70 into position between the upper vacuum mold 36 on one side and the lower mold 34 and conveyor rolls 19 on the other side. The carriage 96 stops with the ring-like member 70 at its aforesaid upstream position directly below the upper vacuum mold 36. At the same time, when the ring-like member 70 occupies its upstream position immediately below the upper vacuum mold 36, the vacuum in upper vacuum mold 36 is released, thereby permitting the shaped glass sheet to be deposited onto the ring-like member 70.

The shape of the ring-like member transverse to the path of movement, and particularly its transversely extending position, may have the same curvature or a different curvature from that defined by the downwardly facing shaping surface of the upper vacuum mold 36. When a ring-like member 70 has a shaping surface that is more shallow than that defined by the upper vacuum mold 36, the glass sheet, still soft from its heating in the furnace 12, is dropped so that its center portion initially rests on the center portion of the transversely extending rail portion of the ring-like member and the extremities of the glass sheet initially bent to a sharper curvature are spaced upward from the shaping rail transverse portion. However, before the carriage 96 moves the glass sheet into the cooling station 14, its end portions sag to conform to the remainder of the outline configuration of the shaping rail of the ring-like member 70.

As an alternative, the glass sheet may be dropped onto a ring-like member 70 whose transversely extending rail portion defines a curvature of even sharper radius of bend than that defined by the downward facing shaping surface of the upper vacuum mold 36. The radius of curvature may even be sharper than that defined by the lower mold 34. Thus, when the glass sheet is dropped on the termination of vacuum, only the side edges of the bent glass sheet will initially rest on the transversely extending rail portion of the ring-like member 70 and the glass will then sag to complete its sharper shape in conformance with the upper edge of the transversely extending rail portion of the ring-like member 70.

The glass sheet supported on the ring-like member 70 is transferred to the cooling station 14 where air under pressure is applied through the downward facing nozzles 52 extending from the upper plenum chambers 51 and through the orifices of the lower bar-type nozzles 54 extending upward from the lower plenum chambers 53 to cool the glass as rapidly as possible to impart at least a partial temper thereto. The downstream upper plenum chamber 51 is in its normal position spaced from the corresponding lower plenum chamber 53.

The ring-like member 70 transports the bent glass sheet through the cooling station 14. When it arrives at its most downstream position at the downstream end of the cooling station 14, the reversible pinions 104 stop rotating. At this time, a first glass sheet G1 is being delivered to an unloading station at the downstream end of downstream conveyor 17 and the glass sheet transfer device 15 begins to prepare to transfer the glass sheet from the ring-like member 70 to the downstream conveyor 17, as shown in FIG. 2.

Figure 3:
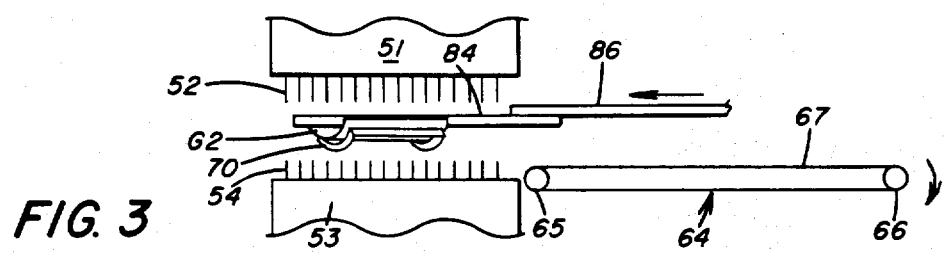
FIGS. 3, 4 and 5 are views similar to that of FIG. 2 taken at successive stages of said repetitive operational cycle.

When the pinions 104 stop, a timer extends the elongated arms 84 in an upstream direction to occupy their upstream position above the ring-like member 70 and below the upper pipe nozzles 52. By this time, the first glass sheet G1 has been unloaded from the downstream conveyor 17, as seen in FIG. 3.

Then, air supplied to the downstream upper plenum chamber 51 is throttled and pinion 57 rotates to lift the downstream upper plenum chamber 51 sufficient distance for their upper pipe nozzles 52 to clear the sharply bent glass sheet while air continues to below through the lower plenum chambers 53 and their upwardly directed bar-type nozzles 54 to disengage a second glass sheet G2 from the ring-like member 70.

Figure 4:
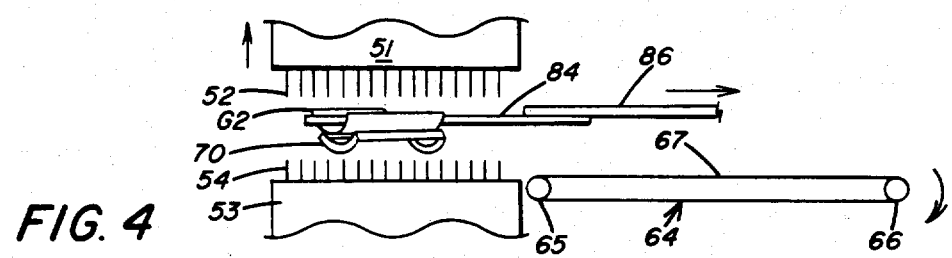

With the air supply to the downstream lifted upper plenum chamber 51 throttled, the net upward force of air that disengages the second glass sheet G2 from the ring-like member 70 causes the upper major surface of the second glass sheet G2 to engage the elongated arms 84, as shown in FIG. 4. A timer retracts the elongated arms in a downstream direction, preferably at a linear speed approximating the downstream linear speed of the upper runs 67 of the transfer belts 64. The glass sheet is pressurized engagement against the elongated arms follows the movement of the elongated arms beyond the cooling station 14.

Figure 5:
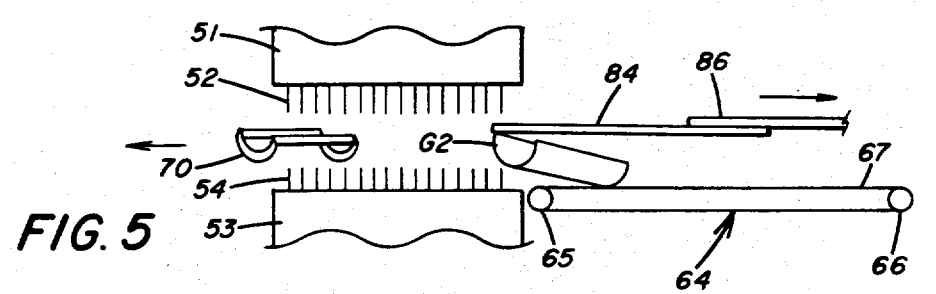

As the leading edge of the second glass sheet G2 passes beyond the downstream exit of the cooling station 14, the second glass sheet G2 tilts downward in a forward direction so that the leading edge of the second glass sheet G2 gently engages the upper runs 67 of the transfer belts 64, as seen in FIG. 5. As the elongated arms 84 continue to retract in a downstream direction, the proportion of the mass of the second glass sheet that the upper run 67 supports increases until the upper run 67 supports the entire mass of the second glass sheet when its trailing edge moves past the downstream exit of the cooling station 14.

In order to insure that the transfer of the bent, tempered glass sheets from the elongated arms 84 to the upper runs 67 is as gentle as possible, the upper runs 67 are supported at a level a slight distance below the level of support for the bottom surface of the elongated arms 84, yet greater than the glass sheet thickness. This slight distance is preferably a small proportion (considerably less than half) of the dimension of the glass sheets longitudinal of the path the glass sheet takes through the cooling station.

When the second glass sheet is transferred completely onto the upper runs 67, the elongated arms 84 are free to extend in an upstream direction to the aforesaid upstream position. They are now in position to receive the next bent, tempered glass sheet that arrives at the downstream plenum chamber of the cooling station 14. The pinion 57 rotates to lower the downstream upper plenum chamber 51 to its normal tempering position and the throttling of the air supply to the downstream upper plenum chamber 51 is ended.

At a proper time, the timer controls the onset of the reverse rotation of the reversible pinions 104 that control the return movement of the racks 102 and their attached ring-like member 70 in an upstream direction to either a parking position immediately downstream of the shaping station or directly into the shaping station. The cycle is ready for repetition when the next glass sheet arrives at a position to actuate the glass sensing element S.

The form of the invention shown and described in this disclosure represents an illustrative preferred embodiment for treating horizontally oriented glass sheets moving along a horizontal path and various modifications thereof. For example, the downstream upper plenum chamber may be lifted a sufficient distance to avoid the need for throttling the flow of tempering medium into the downstream upper plenum chamber to develop a net upward force sufficient to lift the sharply bent glass sheet against the elongated arms. It is also understood that various changes may be made in the exact arrangement and construction of the structural elements of the hereinbefore described transfer device and/or in the manner of orienting and/or the direction of the glass sheet movement path without departing from the gist of the invention except insofar as defined in the claimed subject matter that follows.

I claim:

1. A method of removing a sharply bent, tempered glass sheet from a cooling station where said glass sheet is engaged against a ring-like member while blasts of tempering medium are applied from opposed, spaced pressure sources against the opposite major surfaces of said supported glass sheet from spaced opposed plenum chambers at a rate sufficient to impart at least a partial temper in the glass, and interposing elongated arms between one of said plenum chambers and the major surface of said bent, tempered glass sheet opposite the major surface engaging said ring-like member, characterized by moving one of said pressure sources away from the other of said pressure sources to cause a net flow of tempering medium to provide sufficient force in a direction such as to disengage said bent, tempered glass sheet from said ring-like member and to engage said bent, tempered glass sheet against said elongated arms, moving said arms beyond said one of said plenum chambers with said bent, tempered glass sheet engaged thereagainst in a downstream direction toward an unloading conveyor, tilting the leading edge of said bent, tempered glass sheet away from said elongated arms to transfer said bent, tempered glass sheet gently from said elongated arms to an upper run of said unloading conveyor while preventing said bent, tempered glass sheet from falling uncontrollably from said elongated arms to avoid impacting said glass sheet sharply onto said upper run.

2. A method as in claim 1, further including moving said upper run at a speed approximating the speed at which said elongated arms move beyond said one of said plenum chambers.

3. A method as in claim 1 or claim 2, wherein said glass sheet is supported in a substantially horizontal orientation on said ring-like member for transfer through said cooling station provided with upper and lower pressure sources prior to interposing said elongated arms and lifting said upper pressure source away from the lower pressure source.

4. A method as in claim 3, further including applying tempering medium toward said opposite major surfaces with a sufficiently greater downward force than upward force so as to maintain said glass sheet on said ring-like member during its transfer through said cooling station and lifting said upper pressure source and reducing the pressure applied therefrom sufficiently to reverse the direction of said net force to apply a net upward force after interposing said elongated arms between said upper plenum chamber and said bent, tempered glass sheet.

5. Apparatus for transferring a sharply bent, tempered glass sheet gently from a ring-like member to the upper run of an unloading conveyor comprising a cooling station having an upper plenum chamber and a lower plenum chamber, means to convey said ring-like member supporting said glass sheet through said cooling station between said plenum chambers, means to deliver tempering medium under pressure to said plenum chambers for delivery against the opposite major surfaces of said glass sheet when the latter is supported on said ring-like member, elongated arms adapted for movement along a path at a level between the level of the path taken by said ring-like member and a normal position occupied by said upper plenum chamber between an upstream position between said plenum chambers and a downstream position downstream of said cooling station, means to provide a net upward force of tempering medium in said upstream position between said plenum chambers when said elongated arms occupy said upstream position to disengage said bent, tempered glass sheet from said ring-like member and to engage said bent, tempered glass sheet against said elongated arms, means to lift the upper plenum chamber away from said elongated arms, means to move said elongated arms to said downstream position with said bent, tempered glass sheet engaged thereagainst, means to lower said upper plenum chamber to said normal position, and an unloading conveyor located downstream of said cooling station, said unloading conveyor having an upper run occupying a position at a level slightly below the level occupied by said elongated arms, whereby, when said bent, tempered glass sheet moves into said downstream position, it tilts with its leading edge moving downward to transfer gently from engagement with said elongated arms into engagement with said upper run.

6. Apparatus as in claim 5, wherein means is provided to move said upper run of said unloading conveyor at a speed approximating the speed of movement of said elongated arms into said downstream position.

7. Apparatus as in claim 5 or claim 6, wherein said means to provide a net upward force of tempering medium comprises means to throttle the flow of tempering medium to said upper plenum chamber for delivery to said bent, tempered glass sheet.

* * * * *